United States Patent
Ito et al.

(10) Patent No.: US 7,076,623 B1
(45) Date of Patent: Jul. 11, 2006

(54) INFORMATION UPDATE COUNT MANAGING METHOD, INFORMATION UPDATE COUNT MANAGING APPARATUS, CONTENTS USAGE COUNT MANAGING METHOD, AND CONTENT USAGE COUNT STORING APPARATUS

(75) Inventors: Motoshi Ito, Osaka (JP); Yoshihisa Fukushima, Osaka (JP); Shinji Sasaki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 572 days.

(21) Appl. No.: 09/689,533

(22) Filed: Oct. 12, 2000

(30) Foreign Application Priority Data

Oct. 18, 1999 (JP) ................................ 11-295048

(51) Int. Cl.
*G06F 12/16* (2006.01)
(52) U.S. Cl. .......................... 711/163; 711/4; 711/102; 711/103; 711/154; 711/164; 711/166; 386/21; 386/68; 386/94; 386/124; 365/218; 365/230.01; 365/230.03
(58) Field of Classification Search ........ 711/102–103, 711/163–164; 386/21, 94–97, 102–106; 713/168, 170, 182, 200–202; 380/201, 203, 380/227, 230, 232; 369/13.01, 13.04, 13.25; 360/55, 60, 57, 13; 365/185.29, 185.33, 365/185.01, 201, 218, 230.03
See application file for complete search history.

(56) References Cited

U.S. PATENT DOCUMENTS

| | | | | |
|---|---|---|---|---|
| 5,479,638 A | * | 12/1995 | Assar et al. ................. | 711/103 |
| 5,504,701 A | * | 4/1996 | Takahashi et al. ..... | 365/185.04 |
| 5,513,333 A | * | 4/1996 | Kynett et al. ................ | 711/103 |
| 5,544,356 A | * | 8/1996 | Robinson et al. ........... | 707/205 |
| 5,621,687 A | * | 4/1997 | Doller .................... | 365/185.29 |
| 5,936,909 A | * | 8/1999 | Sonoda et al. ......... | 365/230.03 |
| 5,963,909 A | * | 10/1999 | Warren et al. .................. | 705/1 |
| 5,963,970 A | * | 10/1999 | Davis ......................... | 711/103 |
| 6,122,434 A | * | 9/2000 | Sawabe et al. ............... | 386/94 |
| 6,141,483 A | | 10/2000 | Yamada et al. | |
| 6,249,838 B1 | * | 6/2001 | Kon .......................... | 711/103 |
| 2003/0196110 A1 | * | 10/2003 | Lampson et al. ........... | 713/200 |

FOREIGN PATENT DOCUMENTS

| | | |
|---|---|---|
| EP | 1065667 A2 * | 1/2001 |
| JP | 2001014870 A * | 1/2001 |
| KR | 1998-064832 | 10/1998 |

OTHER PUBLICATIONS

Office Action dated Aug. 27, 2002.

\* cited by examiner

*Primary Examiner*—Matthew Kim
*Assistant Examiner*—Zhuo H. Li

(57) ABSTRACT

The present invention provides an information update count managing method, including: a write step of writing pieces of information in a predetermined order in an information storage area including at least one WORD of a non-volatile memory, wherein information can be written to the non-volatile memory in a unit of WORDs, each WORD including a plurality of bits, and information can be erased from the non-volatile memory in a unit of sectors, each sector including a plurality of WORDS; and a read step of reading out the last piece of information which has been written in the information storage area within a predetermined permitted update count.

34 Claims, 15 Drawing Sheets

| Region | A | B | C | D | E | F | G | H |
|---|---|---|---|---|---|---|---|---|
| Content 1 | 0 | 1 | 0 | 0 | 1 | 1 | 1 | 1 |

| Region | A | B | C | D | E | F | G | H |
|---|---|---|---|---|---|---|---|---|
| Content 2 | 1 | 0 | 1 | 0 | 0 | 0 | 0 | 0 |

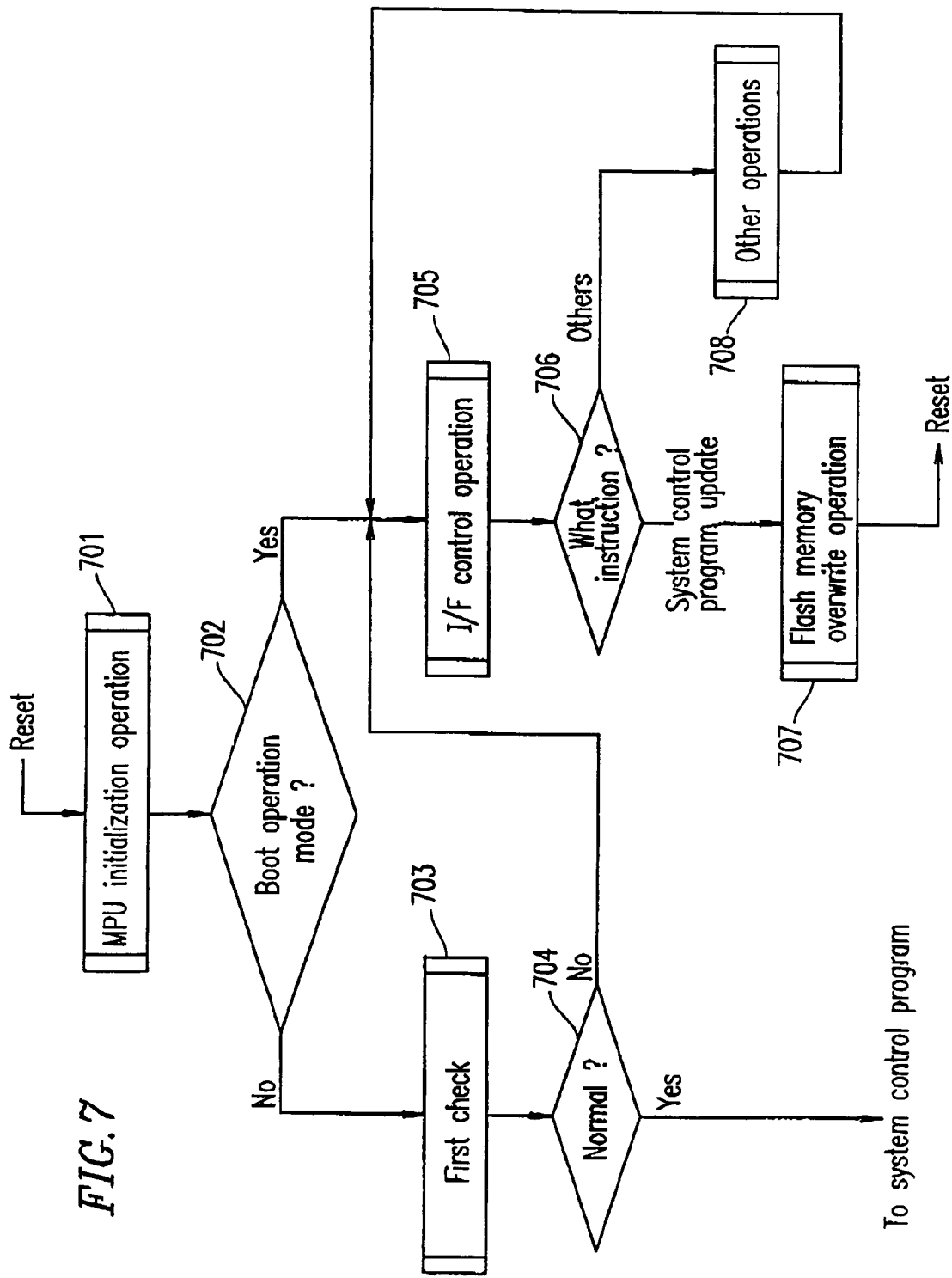

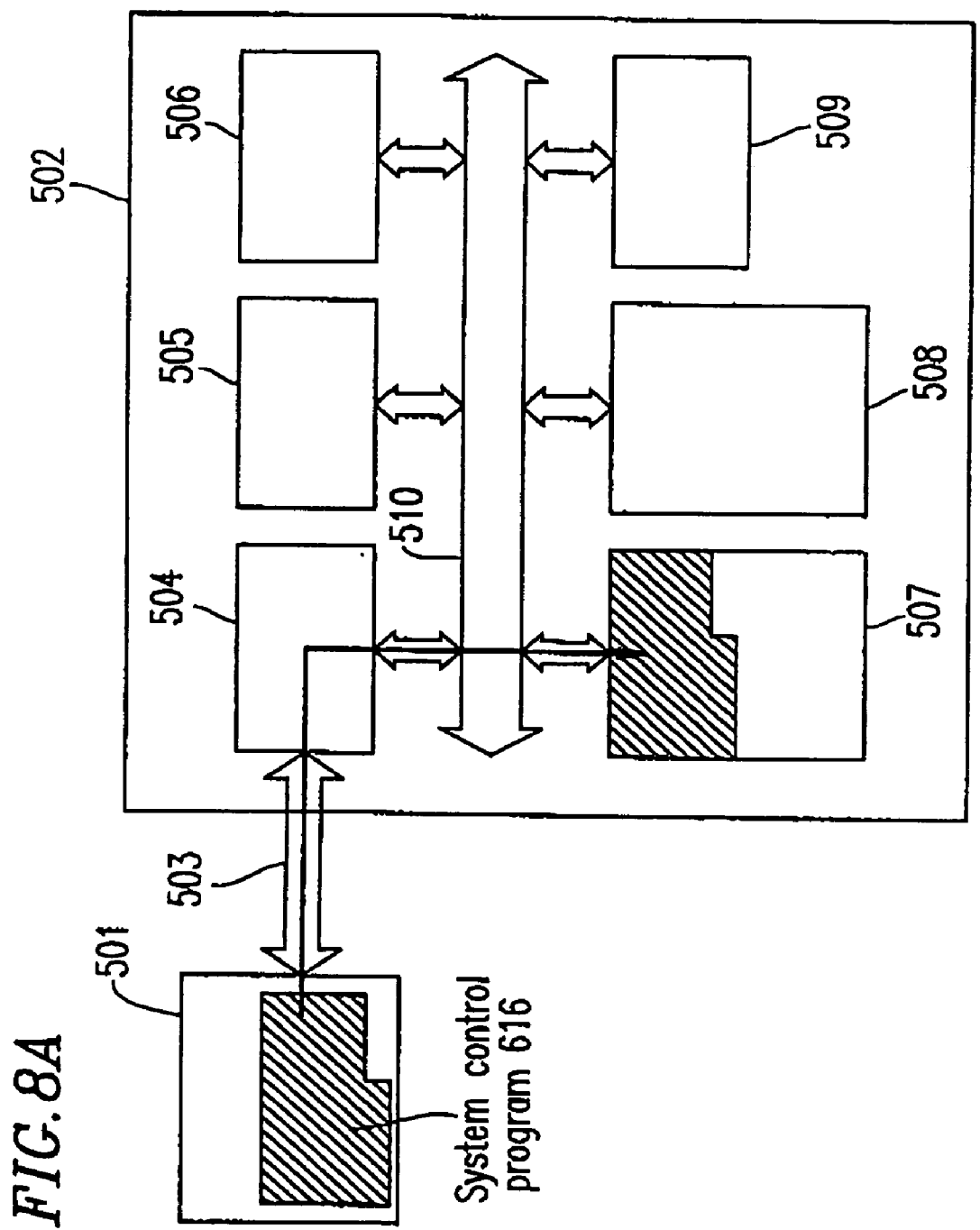

INFORMATION UPDATE COUNT MANAGING METHOD, INFORMATION UPDATE COUNT MANAGING APPARATUS, CONTENTS USAGE COUNT MANAGING METHOD, AND CONTENT USAGE COUNT STORING APPARATUS

BACKGROUND OF THE INVENTION

1. Field of the Invention

The present invention relates to an information update count managing method and an information update count managing apparatus for managing the number of times certain information has been updated (hereinafter, "information update count"). The present invention also relates to a contents usage count managing method and a contents usage count storing apparatus for managing the number of times certain contents such as software or a movie have been used (hereinafter, "contents usage count").

2. Description of the Related Art

Recently, an advanced video compression technique which is called "MPEG2" and an optical disc having a large capacity of about 5 GB which is called "DVD (digital video disc)" have been developed in the art. The combination of the two has enabled high quality digital AV data having a length of 2 hours or more to be recorded on a single DVD. As a result, video contents such as movies can now be enjoyed at home with a high image quality.

In the movie industry, it has been customary to release a new movie at different times in different countries/regions. Taking Hollywood movies for example, they are normally released first in the United States and then in Japan and/or in Europe half a year later. As a result, it is possible to selectively distribute popular movies worldwide based on their performances in the United States, or to have a sufficient period of time to solve ethical problems which may be encountered in playing certain movies in different countries/regions. Particularly, the ethical policies of groups of people depend on their customs and religions and vary from one country to another. A movie that has no ethical problem in one country may have some ethical problems in another country, and therefore one must carefully consider which movies can be released in each country.

In view of this, a DVD and a DVD reproduction apparatus are provided with a mechanism for controlling regions where the DVD can be reproduced. Specifically, a DVD contains information indicating region(s) where the disc can be reproduced, and a DVD reproduction apparatus stores information indicating region(s) where the apparatus can be used.

If the only object to be achieved is to be able to store regional information in the DVD reproduction apparatus, the regional information can be set therein by using a switch (jumper pins, a dip switch, etc.), a non-volatile memory which can be written to only once (PROM), or a non-volatile memory which can be written to as many times as desired (EEPROM).

However, it may be inconvenient if the setting of the regional information is permitted only once, particularly when the user is transferred to a new work location abroad or when the manufacturer wishes to change the destination for export. Conversely, when the setting is permitted an unlimited number of times, the above-described ethical problems arise. In view of this, a DVD system has been designed with an upper limit for the number of times the setting is permitted, whereby the user is permitted to re-set the region of use up to the upper limit. Such a design is typically implemented by employing an EEPROM in which data can be erased/written in a unit of WORDs (e.g., bytes), and storing the regional information which is currently set and the number of times the setting has been done (hereinafter, "setting count").

However, the technique of simply storing the regional information and/or the setting count in an EEPROM, or the like, has been vulnerable to illegal alterations such as illegally cracking or hacking the regional control. For example, if the location in the EEPROM where the regional information or the setting count is stored is revealed, the setting count value can be altered, whereby the setting is permitted an unlimited number of times. If such an illegal alteration becomes widespread among the consuming public, valuable contents can no longer be distributed, thereby detracting from the benefits to the majority of the users who are properly observing copyrights.

It is also meaningful to set, in addition to the regional information, a contents usage count ("usage" herein includes playing and copying) for controlling the number of times contents such as general software or movies can be used. For example, where the charge for a certain content is determined according to the number of times the user is permitted to use the content, the user can obtain the right to use the content to an extent which is determined based on the amount of charge the user pays. Still, if the usage count control is cracked or hacked by an illegal alteration, the content can then be used an unlimited number of times. In such a case, valuable contents can no longer be distributed, thereby detracting from the benefits to the majority of the users who are properly observing copyrights.

SUMMARY OF THE INVENTION

According to one aspect of this invention, there is provided an information update count managing method, including: a write step of writing pieces of information in a predetermined order in an information storage area including at least one WORD of a non-volatile memory, wherein information can be written to the non-volatile memory in a unit of WORDS, each WORD including a plurality of bits, and information can be erased from the non-volatile memory in a unit of sectors, each sector including a plurality of WORDS; and a read step of reading out the last piece of information which has been written in the information storage area within a predetermined permitted update count.

In one embodiment of the invention, the method further includes an erase step of erasing all of the BITs of all of the WORDs in the sector including the information storage area.

In one embodiment of the invention, the method further includes an erase step of setting all of the BITs of all of the WORDs in each sector to "1".

In one embodiment of the invention, the information storage area is provided in a same sector as an initialization operation program which is a first program to be executed after a reset.

In one embodiment of the invention, the predetermined order is an ascending order of addresses of the WORDs.

In one embodiment of the invention, the predetermined permitted update count is determined based on the number of WORDs in the information storage area.

In one embodiment of the invention, the pieces of information include regional information which is used for controlling a region where a content can be reproduced.

In one embodiment of the invention, the write step comprises a step of writing one or more of the plurality of BITs in the at least one WORD from "1" to "1"; and the read step comprises a step of reading out, as the last piece of information which has been written in the information storage area within the predetermined permitted update count, a last hit WORD found in a search through the information storage area for WORDs in which at least one BIT is "0", the WORDs in the information storage area being searched through in the predetermined order.

In one embodiment of the invention, the write step comprises a step of writing one BIT in the at least one WORD from "1" to "0"; and the read step comprises a step of determining the information of a WORD in which two or more bits are "0" to be invalid.

In one embodiment of the invention, the write step comprises a step of storing, in an update count storage area, the number of times information has been written in the information storage area.

In one embodiment of the invention, the update count storage area is in the same sector as an initialization operation program which is a first program to be executed after a reset.

According to another aspect of this invention, there is provided an information update count managing apparatus, including: a non-volatile memory wherein information can be written to the non-volatile memory in a unit of WORDs, each WORD including a plurality of bits, and information can be erased from the non-volatile memory in a unit of sectors, each sector including a plurality of WORDs, and wherein the non-volatile memory comprises an information storage area including at least one WORD in a first sector of the non-volatile memory; and a micro processor unit for writing pieces of information in a predetermined order in the WORDs of the information storage area and for reading out a last piece of information which has been written in the at least one WORD of the information storage area within a predetermined permitted update count.

In one embodiment of the invention, the first sector includes a first program to be executed by the micro processor unit.

In one embodiment of the invention, the predetermined order is based on addresses of the WORDs.

In one embodiment of the invention, the predetermined permitted update count is determined based on the number of WORDs in the information storage area.

In one embodiment of the invention, the pieces of information include regional information which is used for controlling a region where a content can be reproduced.

In one embodiment of the invention, the micro processor unit writes one or more of the plurality of BITs in the at least one WORD from "1" to "0", and reads out, as a last piece of information which has been written in the information storage area within the predetermined permitted update count, a last hit WORD found in a search through the information storage area for the at least one WORD in which at least one BIT is "0", the WORDs in the information storage area being searched through in the predetermined order.

In one embodiment of the invention, the micro processor unit writes one BIT in the at least one WORD from "1" to "0", and determines the information of a WORD in which two or more bits are "0" to be invalid.

In one embodiment of the invention, the non-volatile memory comprises an update count storage area for storing the number of times information has been written in the information storage area.

In one embodiment of the invention, the update count storage area is in the same sector as an initialization operation program which is a first program to be executed by the micro processor unit.

According to still another aspect of this invention, there is provided a contents usage count managing method, including: a write step of writing a contents usage count in a contents usage count storage area including at least one WORD of a non-volatile memory, wherein information can be written to the non-volatile memory in a unit of WORDS, each WORD including a plurality of bits, and information can be erased from the non-volatile memory in a unit of sectors, each sector including a plurality of WORDs; and a read step of searching for and reading out the contents usage count which has been written in the contents usage count storage area.

In one embodiment of the invention, the contents usage count storage area of the non-volatile memory is in a sector which includes a first program to be executed after a reset.

In one embodiment of the invention, the contents usage count is read out as the number of remaining times the content can be used.

In one embodiment of the invention, the contents usage count is read out as the number of times the content has been used.

According to still another aspect of this invention, there is provided a contents usage count storing apparatus, including: a non-volatile memory wherein information can be written to the non-volatile memory in a unit of WORDs, each WORD including a plurality of bits, and information can be erased from the non-volatile memory in a unit of sectors, each sector including a plurality of WORDs, and wherein the non-volatile memory comprises a contents usage count storage area including at least one WORD in the first sector of the non-volatile memory; and a micro processor unit for writing a contents usage count in the contents usage count storage area and for reading out the contents usage count which has been written in the contents usage count storage area.

In one embodiment of the invention, the first sector of the non-volatile memory includes a first program to be executed by the micro processor unit.

In one embodiment of the invention, the contents usage count is read out as the number of remaining times the content can be used.

In one embodiment of the invention, the contents usage count is read out as the number of times the content has been used.

According to still another aspect of this invention, there is provided an information update count managing apparatus, including: a non-volatile memory wherein information can be written to the non-volatile memory in a unit of WORDs, each WORD including a plurality of bits, and information can be erased from the non-volatile memory in a unit of sectors, each sector including a plurality of WORDS; and a micro processor unit. The non-volatile memory includes a boot area and a system area each including one or more sectors. The boot area comprises an information storage area including at least one WORD. A microprocessor unit initialization program for initializing the micro processor unit is provided in the boot area. The micro processor unit writes pieces of information in a predetermined order in an information storage area in the unit of WORDS, and searches for and reads out a last piece of information which has been written in the information storage area within a predetermined permitted update count.

In one embodiment of the invention, the boot area further comprises a check program for checking contents of the information storage area.

In one embodiment of the invention, immediately after the micro processor unit is reset, the micro processor unit executes the micro processor unit initialization program and then the check program, and then the program stored in the system area.

In one embodiment of the invention, the boot area further comprises I/F control means for receiving a program to be stored in the system area from an upper control unit which is connected to the information update count managing is apparatus.

In one embodiment of the invention, the boot area further comprises Flash Memory update means for updating a program in the system area.

In one embodiment of the invention, immediately after the micro processor unit is reset, the micro processor unit executes the micro processor unit initialization program, and then waits for reception from the upper control unit which is connected to the information update count managing apparatus.

In one embodiment of the invention, the micro processor unit calls a program in the boot area from a program in the system area.

Thus, the invention described herein makes possible the advantages of (1) providing an information update count managing method and an information update count managing apparatus for permitting a user to update information only a limited number of times, thereby preventing illegal alterations from becoming widespread; and (2) providing a contents usage count managing method and a contents usage count storing apparatus for limiting the number of times a user is permitted to use a content.

These and other advantages of the present invention will become apparent to those skilled in the art upon reading and understanding the following detailed description with reference to the accompanying figures.

BRIEF DESCRIPTION OF THE DRAWINGS

FIG. 7 is a flow chart illustrating the entire program in a boot area;

FIG. 8A illustrates a first step in the process of updating a system area;

DESCRIPTION OF THE PREFERRED EMBODIMENTS

Various embodiments of the present invention will now be described with reference to the accompanying drawings.

Embodiment 1

A Flash Memory is a non-volatile memory for storing programs and/or data. A Flash Memory is made of a chip which is divided into a number of sectors, and is characterized in that the contents thereof can be erased therefrom at once for the entire chip or in a unit of sectors, and contents can be written thereto by the unit called "WORD" which comprises 8 bits or 16 bits, for example. Each sector includes a plurality of WORDs, and each WORD includes a plurality of bits. In a Flash Memory, as compared to a conventional EEPROM, the unit of erase operation has been simplified from WORD to sector, thereby reducing the production cost per unit storage capacity. In a Flash Memory, an erase operation generally refers to an operation of setting bits to "1", and a write operation generally refers to an operation of writing bits to "0". Thus, in a Flash Memory, a write operation (writing bits from "1" to "0") is performed in a unit of WORDs, and an erase operation (setting bits from "0" to "1") is performed in a unit of sectors.

While in the following description the present invention will be described in connection with applications where a Flash Memory is used, the term "Flash Memory" as used herein refers to any type of non-volatile memory whose memory space is divided into sectors, where an erase operation can be performed in a unit of sectors and a write operation can be performed by the smaller unit of WORDs.

A micro processor unit (hereinafter, referred to as "MPU") can be used to control a Flash Memory. A MPU is typically designed to start executing a program stored in a predetermined address each time the MPU is reset. The program stored in this predetermined address includes processes which are essential when an MPU is used, and may be, for example, an MPU initialization operation program for various settings such as a memory space weight setting, a stack pointer initial value setting, various interrupt enablement/disablement settings, etc.

When a Flash Memory is used to store a program for an MPU, the Flash Memory includes only one sector which includes an address from which the program is executed after the MPU is reset. In this specification, this sector is referred to as the "first sector". If data in this sector is erased, the MPU cannot be initialized properly, and goes out of control. Therefore, this sector is provided so that data cannot be easily erased therefrom, and thus is suitable for storing data which should not be erased.

Now, an operation of updating one WORD of data in a Flash Memory will be described with reference to FIGS. 1A to 1F which illustrate the individual bits included in the WORD.

Figure 1A:
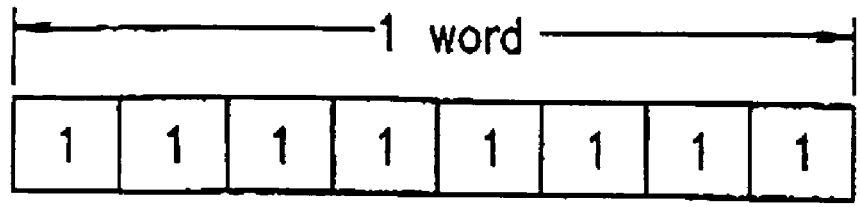
FIG. 1A illustrates data stored in a Flash Memory in an erased state.

When programs including the MPU information operation program are initially written in a Flash Memory using a special-purpose writing device, or the like, a predetermined area of the Flash Memory is left unused as an information storage area. In WORD (e.g., 8 bits) within this information storage area, all of the 8 bits are "1", as illustrated in FIG. 1A.

Figure 1B:
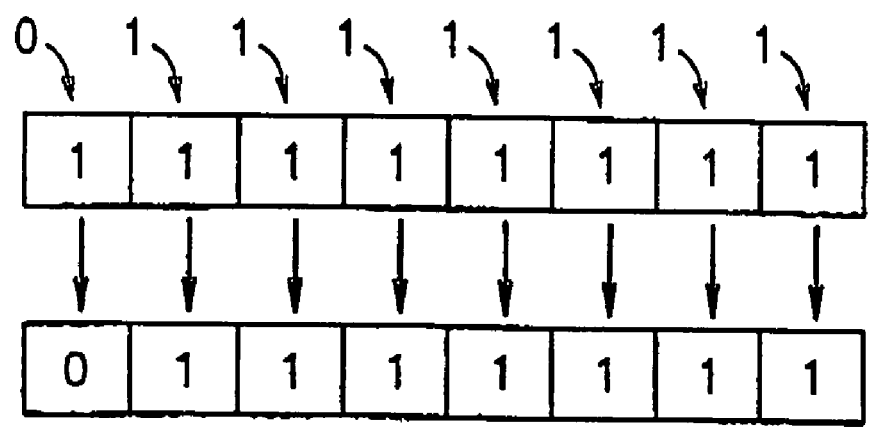
FIG. 1B illustrates date stored in the Flash Memory after a first write operation.

Then, as illustrated in FIG. 1B, this WORD is updated with data having a BIT pattern of "01111111b" (the suffix "b" indicates a binary representation). As a result, "01111111b" is stored in this WORD.

Figure 1C:
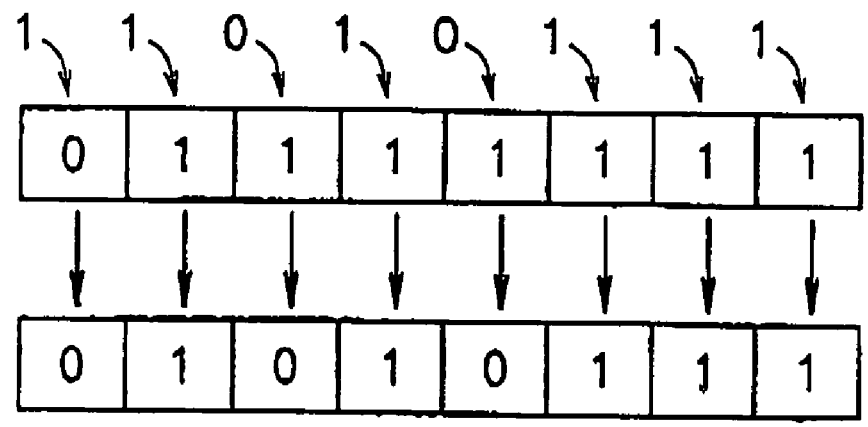
FIG. 1C illustrates data stored in the Flash Memory after a second write operation.

Then, as illustrated in FIG. 1C, the WORD having such a BIT pattern as illustrated in FIG. 1B is further updated with data having a BIT pattern of "11010111b". As a result, "01010111b" is stored in this WORD. Thus, a Flash Memory stores a logical AND of the existing BIT pattern and the new BIT pattern.

Figures 1D, 1E, 1F:
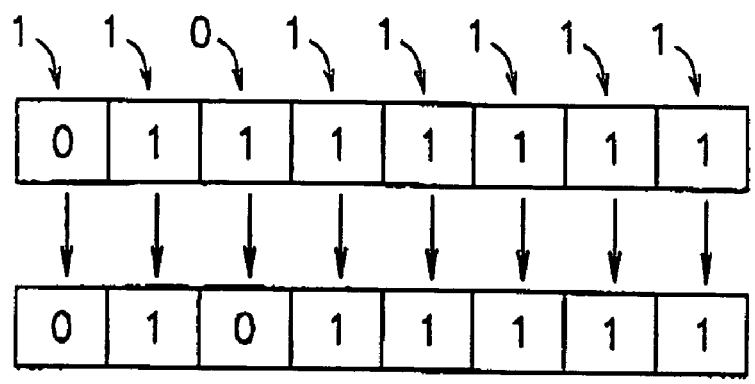
FIG. 1D illustrates data stored in the Flash Memory after another second write operation.
FIG. 1E illustrates data associated with content 1.
FIG. 1F illustrates data associated with content 2.

Similarly, if the WORD having such a BIT pattern as illustrated in FIG. 1B is updated with "11011111b", "01011111b" is stored in this WORD (see FIG. 1D).

Now, a specific example where information on the regional control ("regional information") of an apparatus is stored in the apparatus using a Flash Memory as described above will be described. In such a case, a condition may be set so that the regional information which is stored in a unit of WORDs needs to satisfy the following two conditions: (1) at least one BIT needs to be "0" and (2) the number of "0" bits cannot exceed a predetermined number (otherwise the regional information is considered invalid). It is understood that the apparatus can never be used in more than one region at the same time. For example, in the regional information, one BIT corresponding to the region where the apparatus can be used may be written to "0" while setting the other bits to "1". In such a case, only one BIT of data is supposed to be "0" (condition (1)), and the data is considered invalid if two or more bits thereof is "0" (condition (2)). Thus, data which has two "0" bits such as that illustrated in FIG. 1D is considered invalid (under the condition (2)).

The regional information can be stored in the apparatus as described above. In the resulting data as illustrated in FIG. 1B, only the first BIT of the WORD is "0". If an apparatus has this data as the regional information, the data indicates that the apparatus can be used in a region A. A content used with the apparatus (e.g., a DVD to be reproduced by the apparatus) may also have regional information. In such a case, it is possible to determine whether the apparatus can reproduce the content in a region by collating the regional information contained in the apparatus with that contained in the content. For example, if content 1 has data representing regional information (in this example, one WORD consisting of 8 bits) as illustrated in FIG. 1E, with the 8 bits from the leftmost BIT respectively corresponding to regions A–H, each "0" BIT representing a region where content 1 can be reproduced, and each "1" BIT representing a region where content 1 cannot be reproduced, content 1 can be reproduced by an apparatus which is used in any of regions A, C and D. If the apparatus for reproducing content 1 stores the resulting data as illustrated in FIG. 1B, the apparatus can reproduce content 1. Conversely, such an apparatus cannot reproduce content 2 which has data of "1010000b" as illustrated in FIG. 1F.

Figure 2:
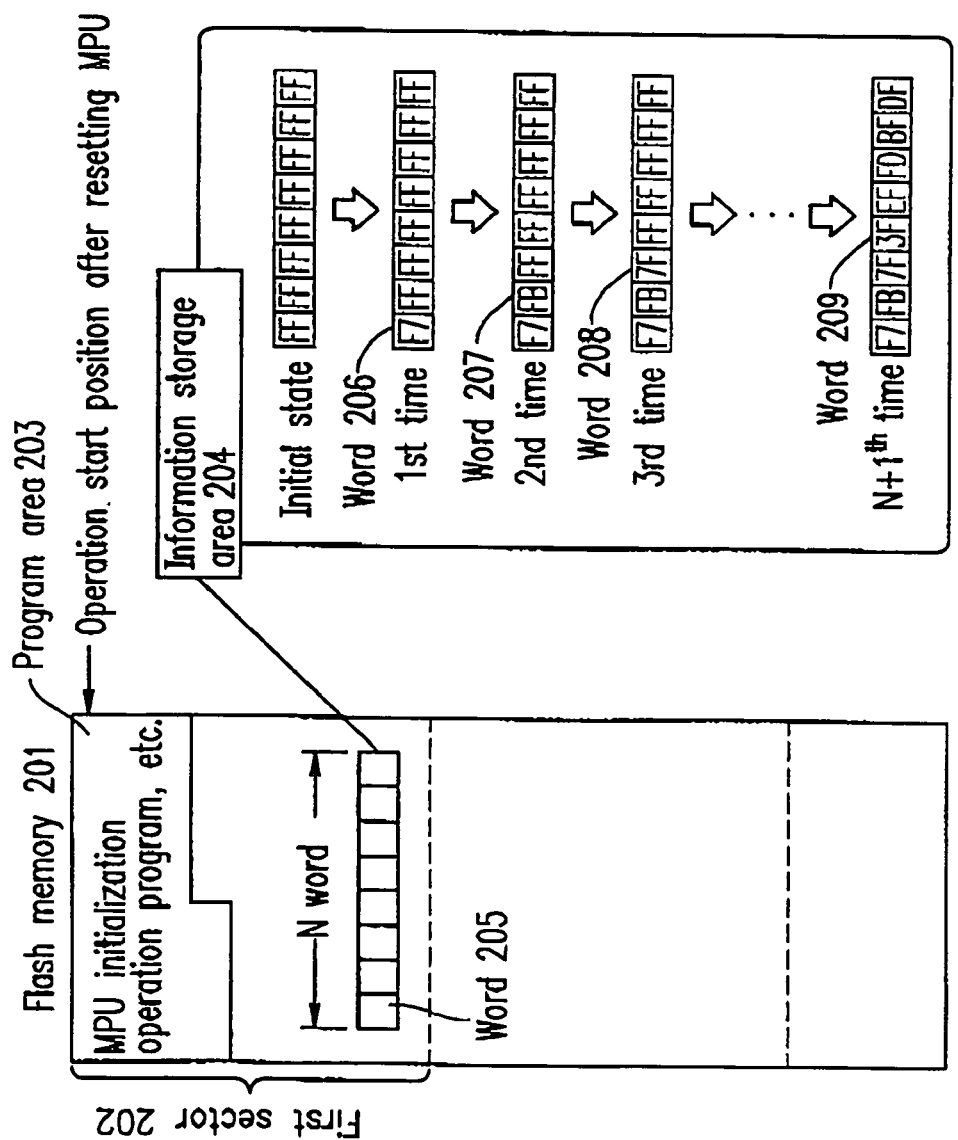
FIG. 2 is a conceptual diagram illustrating a method for managing write data in which one BIT is "0"

In the above-described setting, the number of WORDs of an area for storing information is set to be equal to the number of times it is permitted to perform an update operation. FIG. 2 illustrates a case where the number of times "N" it is permitted to perform an update operation (the upper limit of the number of times the user is permitted to perform an update operation) is set to 8. A regional information managing method will now be described with reference to FIG. 2.

A first sector 202 of a Flash Memory 201 includes a program area 203 containing an MPU initialization operation program and an information storage area 204 having a size of N (=8) WORDs. In this specification, the "first sector" refers to a sector including a program area for storing a program which is initially executed each time an MPU is reset. Therefore, when the MPU is reset, the program at the leading address in the first sector 202 is first executed. In the N-WORD information storage area 204, if no data has been written thereto, all of the bits are "1". In such a case, when each WORD 205 in the information storage area 204 includes 8 bits, for example, the WORD 205 is expressed as "11111111b" in binary representation and as "FFh" in hexadecimal representation (the suffix "h" indicates a hexadecimal representation).

Regional information is written to one of the WORDs 205 of the information storage area 204. When more than one regional information is written in the information storage area 204, the WORDs 205 are sequentially used in an ascending order of WORD addresses. For example, the first regional information ("F7h"="11110111b") is written to a first WORD 206, the second regional information ("FBh"="11111011b") is written to a second WORD 207, and the third regional information ("7Fh"="01111111b") is written to a third WORD 208. When a user has updated the regional information the number of times "1N the user is permitted to update regional information, no more area is available for meaningfully storing regional information. When the user nevertheless writes the N+1$^{th}$ regional information (the 9th regional information in this example) to the fourth WORD 209, for example, exceeding the upper limit of the number of times the user is permitted to perform an update operation, there will be more than one "0" bit ("3Fh"="00111111b") (recall a Flash Memory stores a logical AND of the existing BIT pattern and the new BIT pattern). Thus, the regional information is determined to be invalid.

The last information (i.e., the last piece of information) which has been written in the information storage area 204 can be determined as follows. That is, the information storage area 204 is searched for a WORD in which at least one BIT is "0" in an ascending order of WORD addresses, thereby determining the last "hit" WORD to be the last information which has been written in the information storage area 204. The address of the last "hit" WORD can be stored using the MPU 80 that the last information which has been written in the information storage area 204, within the upper limit of the number of times it is permitted to perform an update operation, can be later retrieved.

In order to use the N WORDs of the information storage area 204 in an ascending order of WORD addresses, each new regional information can be written to an address which is obtained by incrementing the address X of the last WORD used by one.

In the above-described example, the setting is such that always only one BIT in a WORD is supposed to be "0" so that there is always a one-to-one correspondence between one of the regions A–H where the apparatus is used and the only one "0" bit. Alternatively, there may be more than one "0" BIT in a WORD if the information storage area 204 is used to store information on changes in regional information. For example, it may be set so that the regional information which is stored in a unit of WORDs needs to satisfy the following two conditions: (1) at least one BIT needs to be "0": and (2) the number of "0" bits cannot exceed 8 (otherwise the regional information is considered invalid). Since there are only 8 bits in a WORD, the condition (2) is always satisfied. Under the conditions (1) and (2), any regional information having a value other than "FFh" (=11111111b") is considered valid.

In the above-described setting, the BIT value may be inverted ("0" to "1" and "1" to "0"), i.e., (1) at least one BIT of data which is recorded in a unit of WORDs needs to be "1"; and (2) the number of "1" bits of the data cannot exceed a predetermined number. When such an alternative setting is used for the regional information stored in the apparatus, the one BIT corresponding to the region where the apparatus can be used is set to "1" while writing the other bits to "0". In such a case, only one BIT of data is supposed to be "1" (condition (1)), and the data is considered invalid if two or more bits thereof is "1" (condition (2)).

Figure 3:
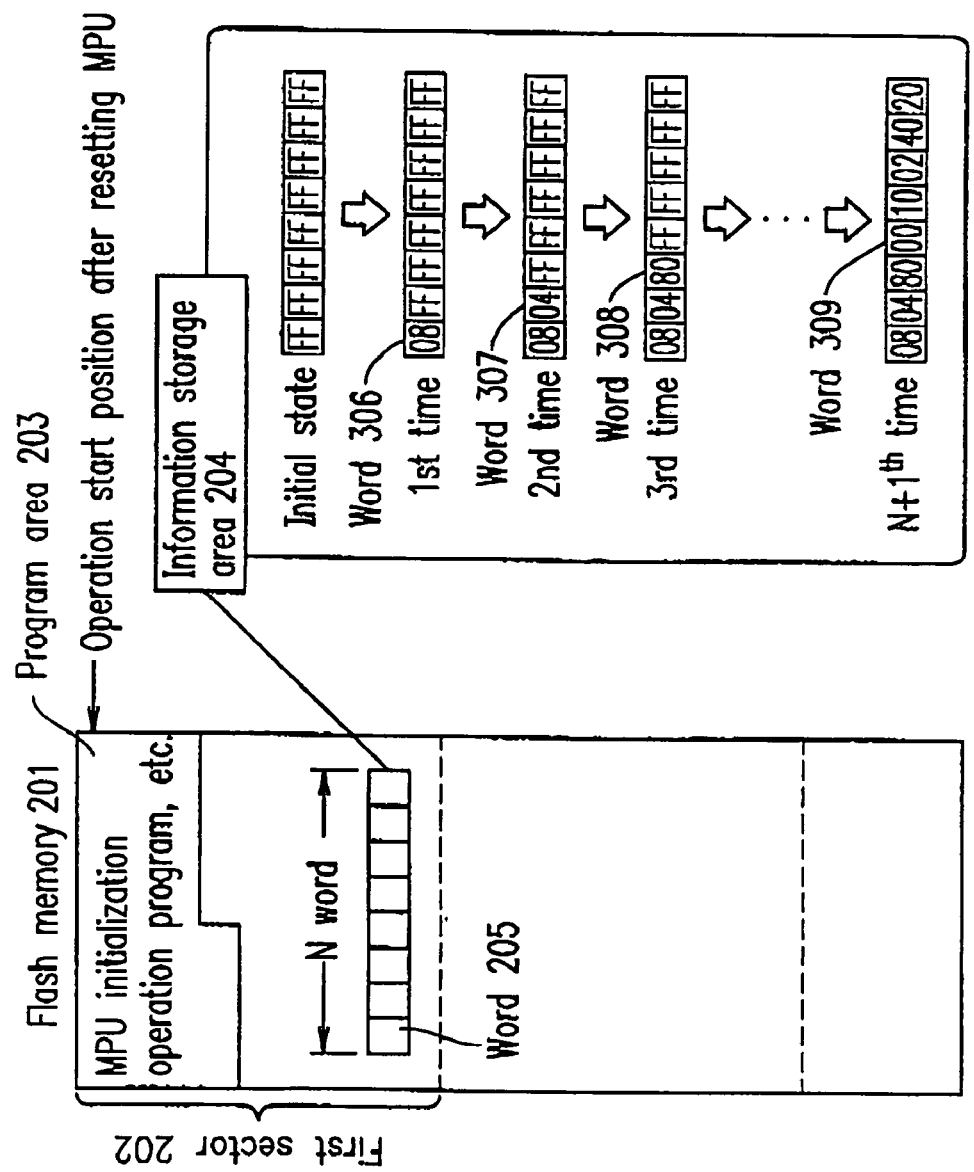
FIG. 3 is a conceptual diagram illustrating another method for managing write data in which one BIT is

FIG. 3 is a conceptual diagram illustrating another, bit-reversed, method for managing regional information. FIG. 3 will now be described, wherein like elements to those shown in FIG. 2 are denoted by like reference numerals and will not be further described below.

Regional information is written to one of the WORDs 205 of the information storage area 204. When more than one regional information is written in the information storage area 204, the WORDs 205 are sequentially used in an ascending order of WORD addresses. For example, the first regional information ("08h"="00001000b") is written to a first WORD 306, the second regional information ("04h"="00000100b") is written to a second WORD 307, and the third regional information ("80h"–"10000000b") is written to a third WORD 308. When a user has updated the regional information the number of times "N" the user is permitted to update regional information, no more area is available for meaningfully storing regional information. When the user nevertheless writes new regional information to the fourth WORD 309, for example, all of the bits therein will be "0" ("00h"="00000000b"). Thus, new regional information cannot be set after the user has updated the regional information the number of times "N" the user is permitted to update regional information. For example, consider a case where "01h" (="00000001b") is set in the WORD 309. When the WORD 309 is updated with a value in which a different BIT is "1" (e.g., "02h"="00000010b"), all of the bits of the WORD 309 become "0" (recall a Flash Memory stores a logical AND of the existing BIT pattern and the new BIT pattern as described above with reference to FIG. 1).

Figure 4A:
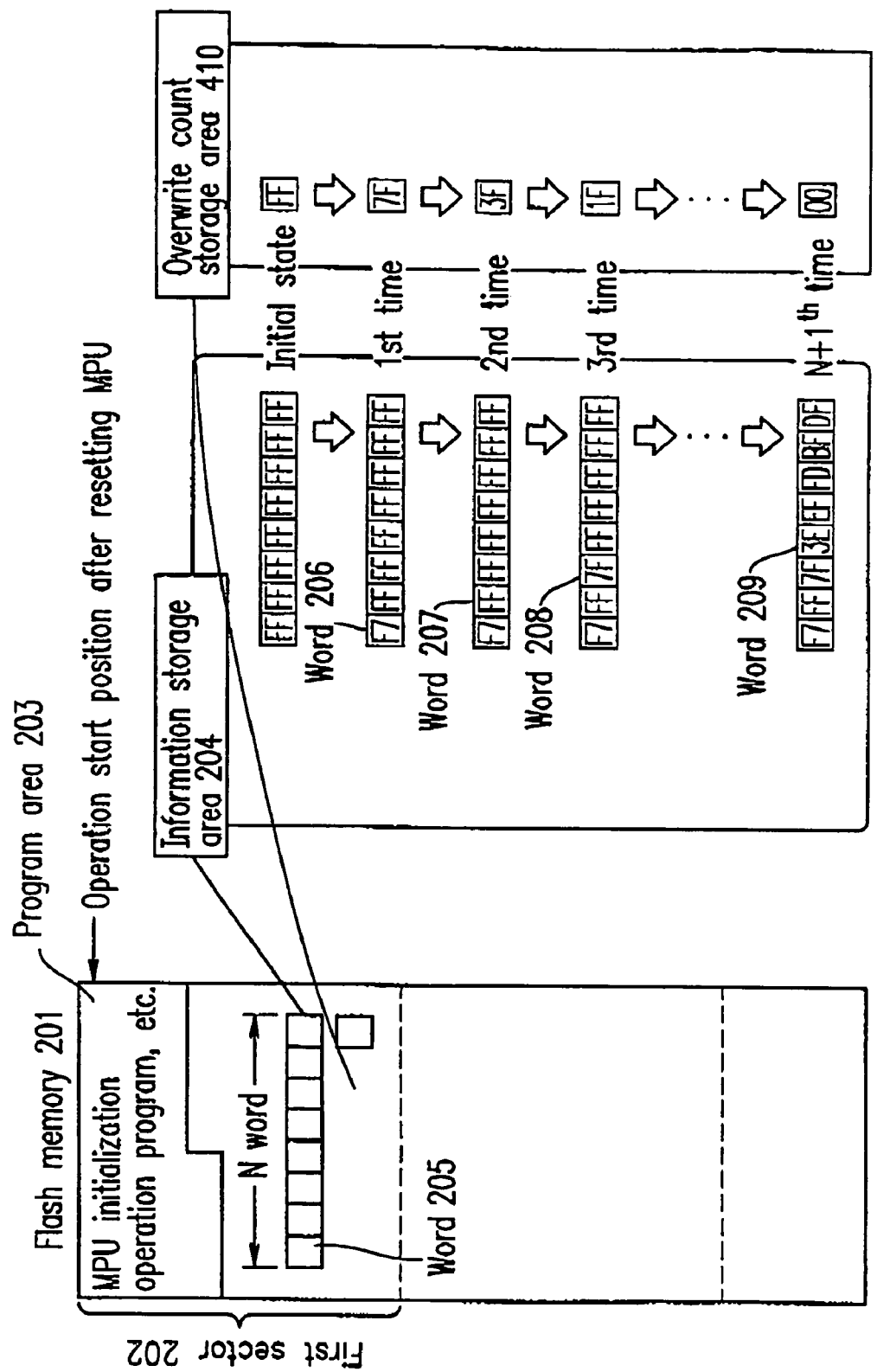
FIG. 4A is a conceptual diagram illustrating a data managing method using an information storage area and an update count storage area.

Next, another method for managing regional information will be described with reference to FIG. 4A, which can be used even in a case where a WORD of regional information may take any value including "FFh" (="11111111b"). In FIG. 4A, like elements to those shown in FIG. 2 are denoted by like reference numerals and will not be further described below.

The Flash Memory 201 additionally includes an update count storage area 410 which includes a number of bits equal to the number of times "N" (=8) the user is permitted to perform an update operation. In the update count storage area 410 is initialized so that all of the bits thereof are "1". Then, each time regional information is written in the information storage area 204, one BIT in the update count storage area 410 is changed to "0".

Regional information is written to one of the WORDs 205 of the information storage area 204. When more than one regional information is written in the information storage area 204, the WORDs 205 are sequentially used in an ascending order of WORD addresses. For example, when the first regional information ("F7h"="11110111b") is written to a first WORD 206, the MSB (Most Significant Bit) of the update count storage area 410 is changed to "0", resulting in a value of "7Fh" (="01111111b"). When the second regional information ("FFh"="1111111b") is written to a second WORD 207, the second significant BIT of the update count storage area 410 is changed to "0", resulting in a value of "3Fh" (="00111111b"). When the third regional information ("7Fh"="01111111b") is written to a third WORD 208, the third significant BIT of the update count storage area 410 is changed to "0", resulting in a value of "1Fh" (="00011111b"). When a user has updated the regional information the number of times "N" the user is permitted to update regional information, no more area is available for meaningfully storing regional information, with all of the bits of the update count storage area 410 being "0" indicating that the user is no longer permitted to perform the update operation. As illustrated in FIG. 4A, when the $N+1^{th}$ write operation is performed, all of the bits of the update count storage area 410 are maintained to be "0".

The last information which has been written in the information storage area 204 can be determined as follows. That is, the number "X" of "0" bits in the update count storage area 410 can be obtained, thereby determining the $X^{th}$ WORD in the information storage area to be the last information which has been written in the information storage area 204. Therefore, the number "X" of "0" bits in the update count storage area 410 indicates the number of times the information has been updated in the information storage area 204. Conversely, the number Y of "1" bits in the update count storage area 410 indicates the number of remaining times the information can be updated in the information storage area 204.

In order to use the N WORDs of the information storage area 204 in an ascending order of WORD addresses, each new regional information can be written to the $X+1^{th}$ WORD.

Figure 4B:
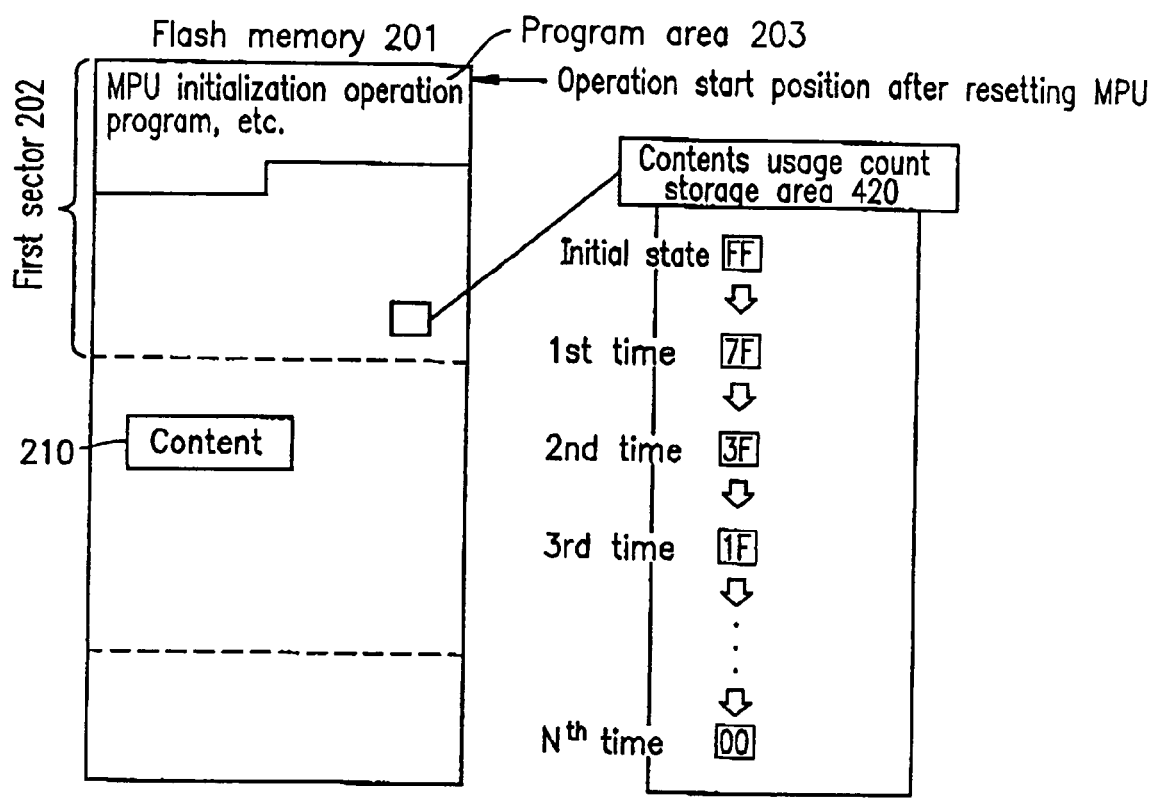
FIG. 4B is a conceptual diagram illustrating a data managing method using an update count storage area storing an update count.

In order to limit the number of times a user is permitted to use a content such as general software, a contents usage count storage area 420 may be provided in the first sector 202 without providing the information storage area 204 as illustrated in FIG. 4B. The contents usage count can be counted because the contents usage count storage area 420 has a similar function as that of the update count storage area 410 described above. The content 210 to be used is typically included in the Flash Memory 201 as illustrated in FIG. 4B.

As illustrated in FIG. 4B, the count of the contents usage count storage area 420 may be decreased each time the content is used, e.g., from "FFh" (="11111111b") to "7Fh" (="01111111b"), to "3Fh" (="00111111b"), and so on. The usage count may thus be decreased by successively writing "0" bits in the contents usage count storage area 420 starting from the leftmost BIT in the BIT pattern, and it is possible to count in a descending order the number of remaining times the content can be used by reading out the number of remaining "1" bits. Conversely, it is possible to count in an ascending order the number of times the content has been used by reading out the number of "0" bits which have been written. The user can no longer use the content when the contents usage count storage area 420 becomes "00h" (="00000000b"). It is possible to count up to 8 when one 8-bit WORD is used.

As described above, Embodiment 1 of the present invention advantageously utilizes a Flash Memory as a WORM (write-once-read memory) based on the characteristic of the Flash Memory that when data is written thereto, without erasing the existing data beforehand, the logical AND of the existing value and the new value is stored therein. Since the information Storage area 204 is present in the same sector as the program area 203, when data stored in the information storage area 204 is erased, data in the program area 203 is also erased. If the data in the program area 203 is erased, the MPU cannot be initialized properly so that the MPU goes out of control. Thus, the user can change the regional information only a predetermined number of times. Since an MPU is designed to start executing a program stored in a particular address each time the MPU is reset, an area to be used as a WORM can be arranged in the sector of the Flash Memory including the particular address to prevent data in the area from being erased so that the area can only be used as a WORM.

Embodiment 2

Now, Embodiment 2 of the present invention will be described with reference to figures. Embodiment 2 of the present invention is an optical disc apparatus which uses an information storage area as described above in Embodiment 1 to check whether the contents of the information storage area are "appropriate" (herein, "the contents of the information storage area being appropriate" means, for example, that the number of times an update operation has been performed or the number of times an information content has been used by the user is within the number of times the user is permitted to do so), thereby ensuring that the apparatus properly operates based on the check results.

Figure 5:
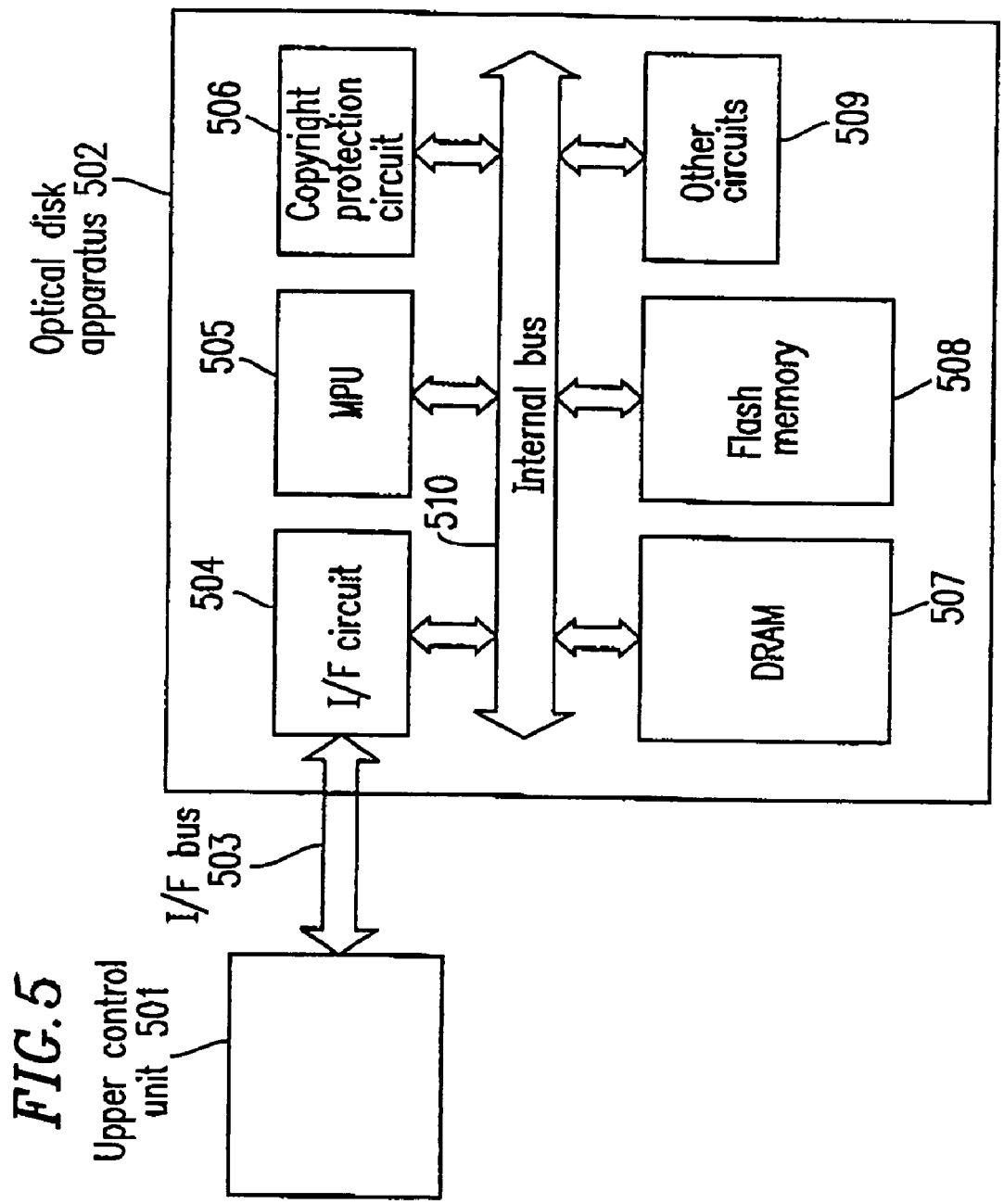
FIG. 5 is a block diagram illustrating the structure of an optical disc apparatus.

FIG. 5 is a block diagram illustrating the structure of an optical disc apparatus 502 according to Embodiment 2 of the present invention. As illustrated in FIG. 5, the optical disc apparatus 502 is connected to an upper control unit 501 such as a personal computer via an I/F (interface) bus 503 such as SCSI or ATAPI bus.

The optical disc apparatus 502 includes a Flash Memory 505, an MPU 505 for controlling the optical disc apparatus 502 according to a control program stored in the Flash Memory 508, an I/F circuit 504 such as SCSI or ATAPI circuit for providing a protocol control, an copyright protection circuit 506 for providing mutual authentication and/or encryption of information so as to protect the copyright of a content to be used, a DRAM 507 for temporarily storing data, and other circuits 509 for providing a servo control of an optical pickup (not shown), photoelectric conversion, signal processing, etc. The I/F circuit 504, the MPU 505, the copyright protection circuit 506, the DRAM 507, the Flash Memory 508, and the other circuits 509 are connected together via an internal bus 510. In the present embodiment, an optical disc apparatus will be described as an example of an information update count managing apparatus or a contents usage count storing apparatus of the present invention. However, it is understood that the present invention is not limited to an optical disc apparatus.

An advantage of using the Flash Memory 508 for storing a control program is that the control program can be modified in order to address any problem occurring in the control program or to accommodate a new standard. However, if one falls to properly modify the control program stored in the Flash Memory 508, the optical disc apparatus 502 may be irrecoverably damaged.

Thus, it is common in the art to divide the memory space of the Flash Memory 508 into a boot area (which contains the minimum function which is required for a recover operation, and which is written only at the time of factory shipment) and a system area (which stores the latest control program and is updated even after the factory shipment) based on the characteristic of the Flash Memory 508 that data can be erased therefrom in a unit of sectors. In view of such a division of the memory space of the Flash Memory 508, it is possible to properly manage the number of times a piece of information has been updated by detecting tampering of information and/or ensuring that the information is always referenced. This can be implemented by a method as described below.

Figure 6:
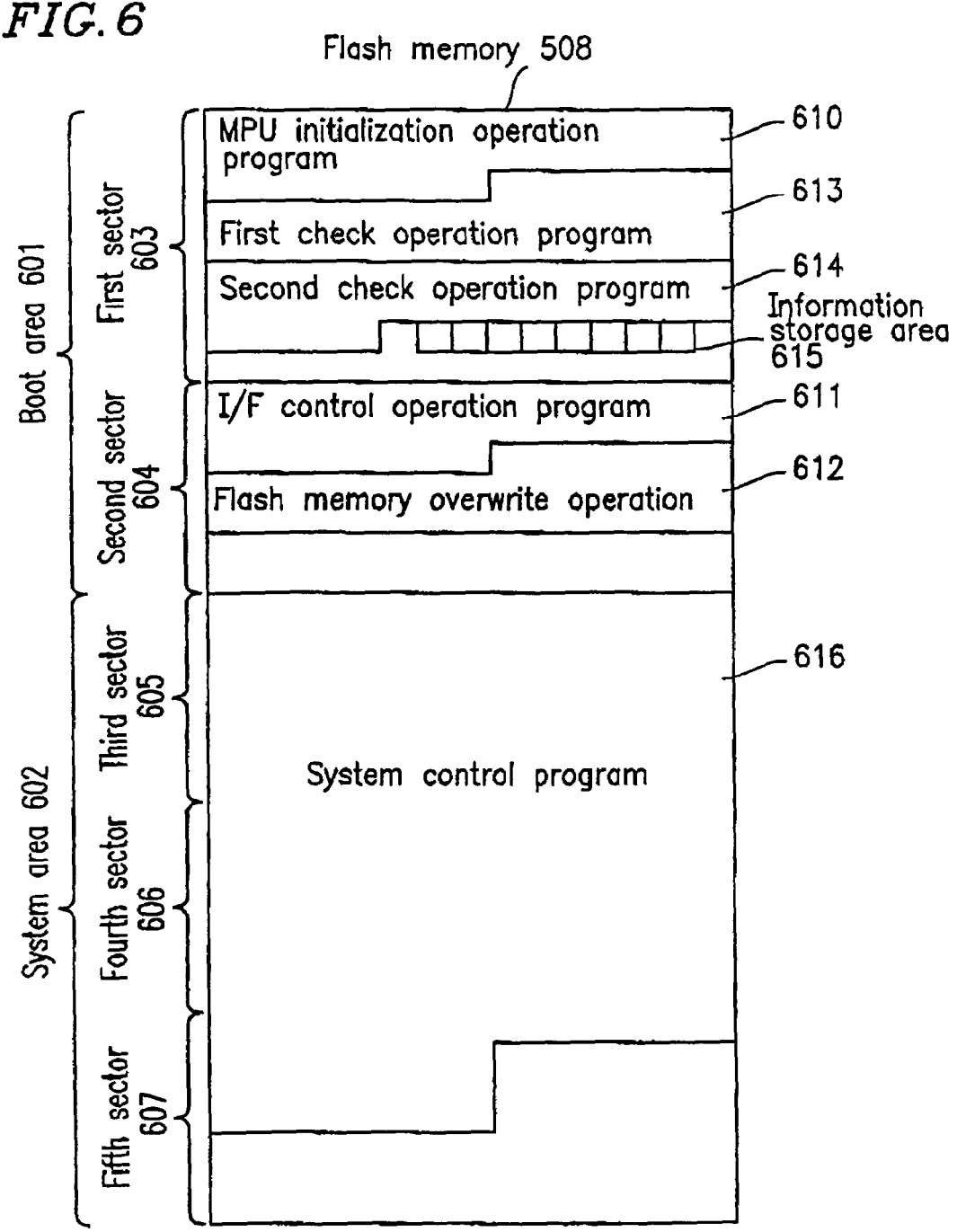
FIG. 6 illustrates the layout of a Flash Memory.

FIG. 6 illustrates the layout of the Flash Memory 508. The memory space of the Flash Memory 508 is generally divided into the boot area 601 and the system area 602. Each of these areas includes a number of sectors of the Flash Memory 508. In this example, the boot area 601 includes a first sector 603 and a second sector 604, and the system area 602 includes a third sector 605, a fourth sector 606 and a fifth sector 607. Since the boot area 601 is required to have the function of recovering the optical disc apparatus 502, the boot area 601 stores an MPU initialization operation program 610, an I/F control operation program 611, and a Flash Memory update operation program 612. The boot area 601 further includes an information storage area 615 for storing information which the user is permitted to use or update only a limited number of times, a first check operation program 613 for checking the contents of the information storage area 615, and a second check operation program 614. The system area 602 stores programs for controlling the other circuits 509 (FIG. 5) and a system control program 616 for implementing all of the functions of the optical disc apparatus 502. The first check operation program 613 and the second check operation program 614 are arranged in the first sector 603 included in the boot area 601 so that they cannot be erased.

FIG. 7 is a flow chart illustrating a main function of the boot area 601. When the MPU 505 is reset, e.g., when the power supply is turned ON, an MPU initialization operation is performed (step 701). Then, it is determined whether or not the control of the MPU is to stay in the boot area 601 (step 702). As long as the control of the MPU stays in the boot area 601 and is not allowed to move onto the system area, the content in the Flash Memory 508 cannot be used. If so, the process proceeds to the I/F control operation (step 705). Otherwise, the process proceeds to the first check operation (step 703). Whether or not the control of the MPU is to stay in the boot area 601 can either be specified by shorting jumper pins or determined by calculating the checksum of data in the system area 602. After the first check operation is performed to check the contents of the information storage area 615 (step 703), it is determined whether or not the contents are appropriate (step 704). If so, the process proceeds to the system control program 616 stored in the system area 602. Otherwise, the process proceeds to the I/F control operation (step 705). In step 705, the MPU performs an I/F control operation of waiting for and receiving a command from the upper control unit 501. Then, it is determined what command the command received from the upper control unit 501 is (step 706). If the received command is to update the system control program, a Flash Memory update operation is performed (step 707) wherein the MPU resets itself. Otherwise, an operation according to the received command is performed (step 708), and the process returns to step 705 to wait for another command from the upper control unit 501.

Figure 8B:
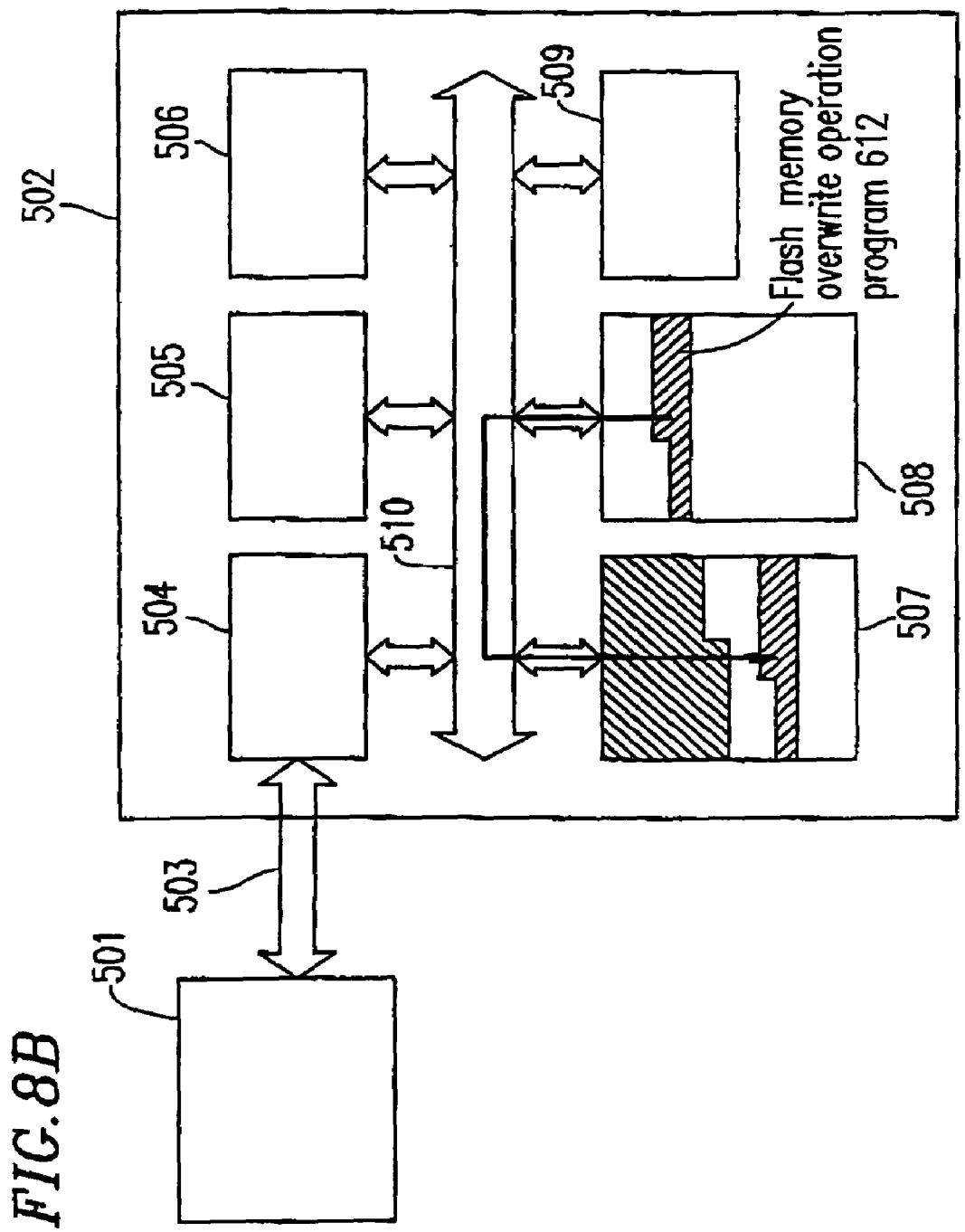
FIG. 8B illustrates a second step in the process of updating a system area.
Figure 8C:
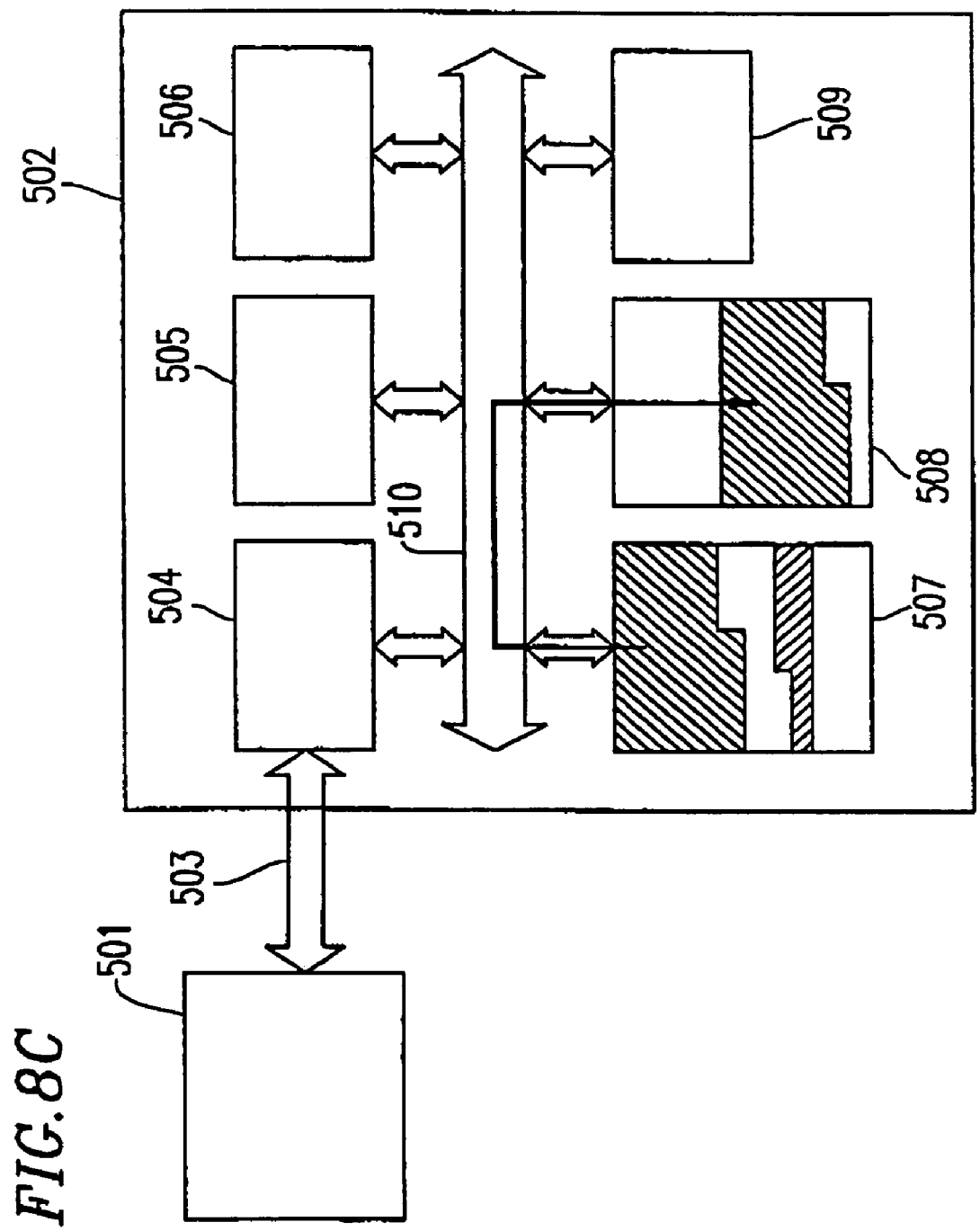
FIG. 8C illustrates a third step in the process of updating a system area.

FIGS. 8A to 8C illustrate the process of updating the system area 602 (corresponding to steps 705–707 in FIG. 7) which is performed in the boot area 601. In FIGS. 8A to 8C, like elements to those shown in FIG. 5 are denoted by like reference numerals.

In FIG. 8A, the upper control unit 501, which has obtained the latest system control program 616 from the Internet, for example, commands the optical disc apparatus 502 to update the system control program and sends the new system control program 616 to the optical disc apparatus 502. The optical disc apparatus 502 temporarily stores the received system control program 616 in the DRAM 507.

In FIG. 8B, the optical disc apparatus 502, which has been commanded to update the system control program, copies the Flash Memory update operation program 612 in the boot area 601 of the Flash Memory 508 into the DRAM 507. The program 612 is copied into the DRAM 507 because the MPU 505 cannot execute programs on the Flash Memory 508 for performing a read operation, and other operations, while updating the Flash Memory 508.

In FIG. 5C, the MPU 505 temporarily transfers control to the Flash Memory update operation program in the DRAM 507, and erases the system area 602 in the Flash Memory 508 according to the program, after which the MPU 505 writes the system control program 616 in the DRAM 507 into the system area 602.

A system control program 616, which is disclosed to users, is likely to be tampered with. Therefore, it is apparent that the first check operation program 613 for checking the contents of the information storage area 615 and the second check operation program 614 are also preferably arranged in the boot area 601 as the information storage area 615. In this specification, the operation of checking the contents of the information storage area is referred to as the "first check operation" and the checking operation regarding the copyright of the system control program is referred to as the "second check operation".

Figure 9:
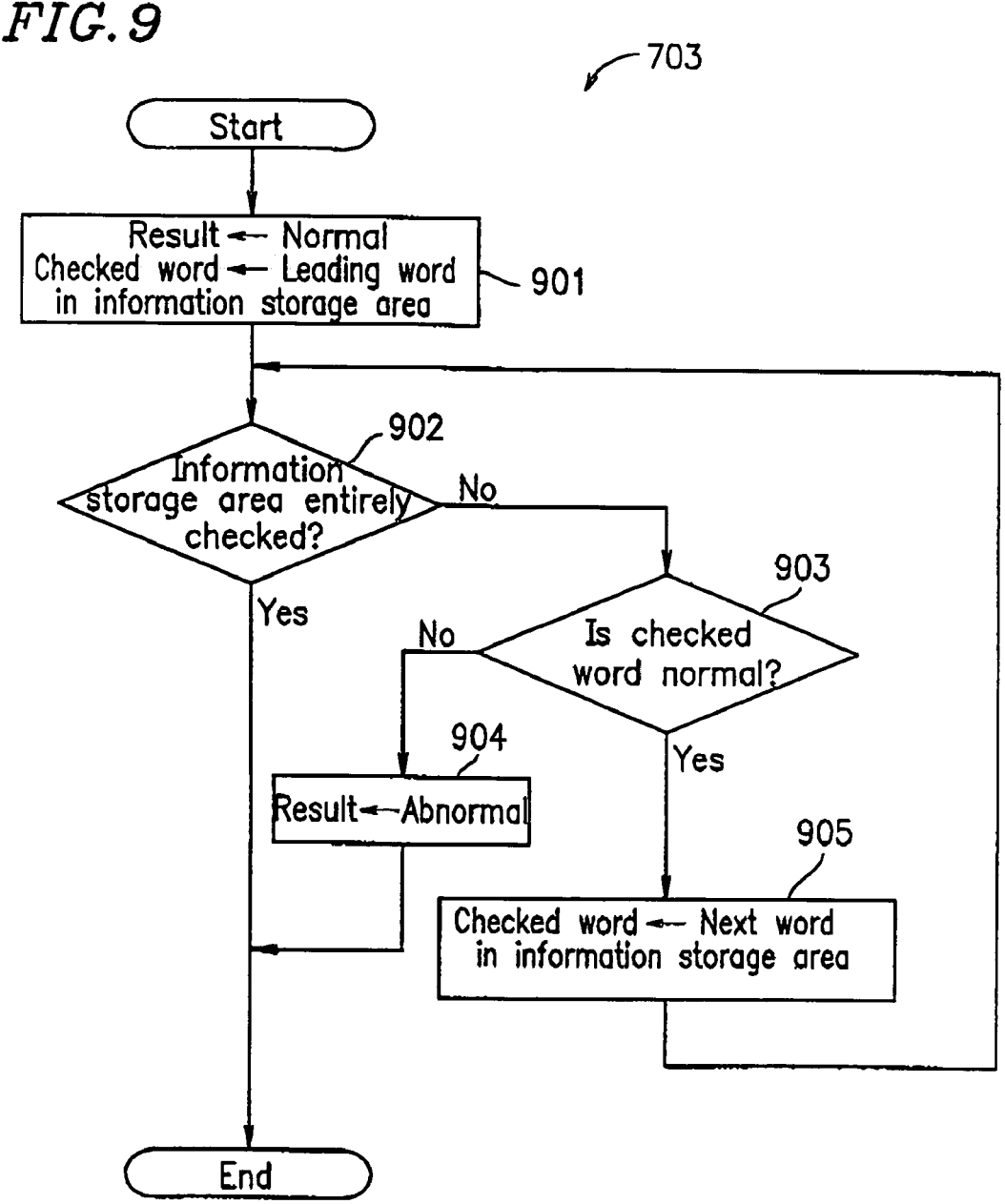
FIG. 9 is a flow chart illustrating a first check operation.

FIG. 9 is a detailed flow chart illustrating the first checking operation (step 703) shown in FIG. 7. First, variables are initialized (step 901). Specifically, the check result is set to "normal", and the WORD to be checked is set to the "leading WORD" in the information storage area 615. Then, until all of the WORDs of the information storage area 615 are checked (step 902), the following process is repeated. It is determined whether or not the checked WORD is appropriate (step 903). If there is any inappropriate value, the check result is set to "abnormal" (step 904), and the check operation is terminated. If the checked WORD has an appropriate value, the WORD to be checked is set to the next WORD in the information storage area 615 (step 905) and the process returns to step 902. When it is determined that all of the WORDs in the information storage area 615 have been checked (step 902), the check operation is terminated.

As described above, the first check operation program 613 is arranged in the boot area 601 (see FIG. 6) in which programs are unlikely to be tampered with, and is executed before control is transferred to the system control program 616 (see FIG. 7). In this way, it is possible to ensure that the operation of checking whether or not the contents of the information storage area 615 have been tampered with is performed. Therefore, it is possible to assure that the contents of the information storage area 615 are trustworthy at the time when control is transferred to the system control program 616.

Figure 10:
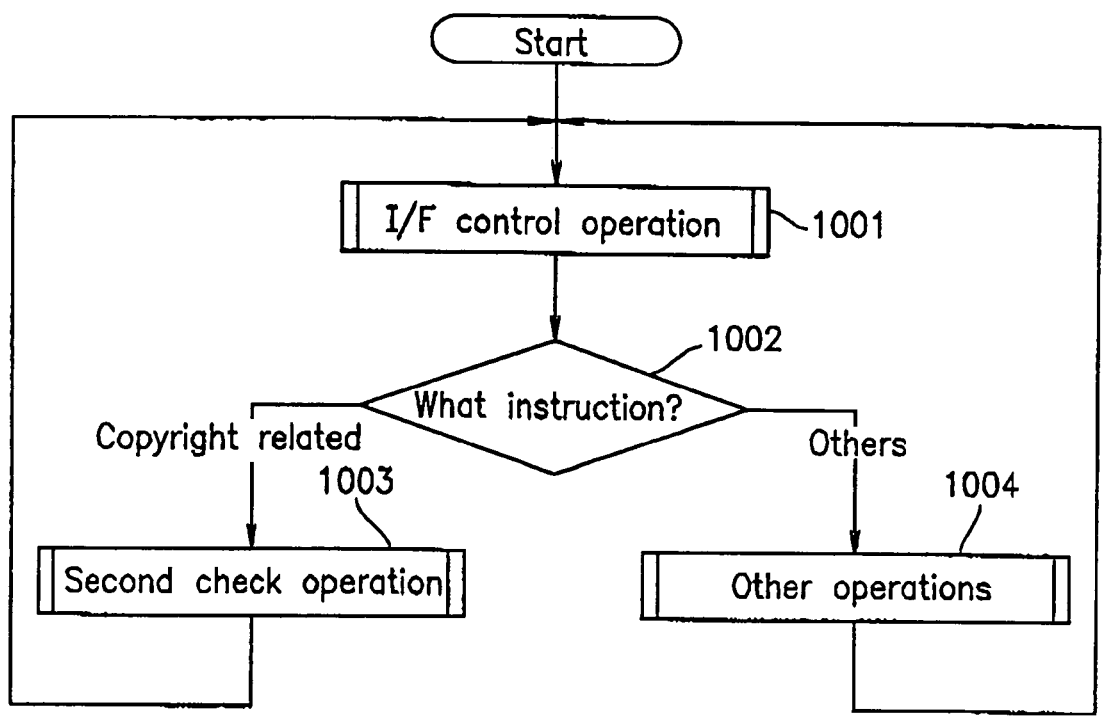
FIG. 10 is a flow chart illustrating the entire program in a system area.

FIG. 10 is a flow chart generally illustrating the process for the system area.

When control is transferred to the system control program 616 stored in the system area 602, the MPU 505 performs an I/F control operation of waiting for and receiving a command from the upper control unit 501 (step 1001). Then, it is determined what command the command received from the upper control unit 501 is (step 1002). If the received command is a command regarding copyright protection, the second check operation program 614 is executed (step 1003) so that the MPU 505 operates according to the contents of the information storage area 615, and the process returns to the I/F control operation at step 1001. Otherwise, another operation built into the system area is performed (step 1004), and the process returns to the I/F control operation at step 1001.

Figure 11:
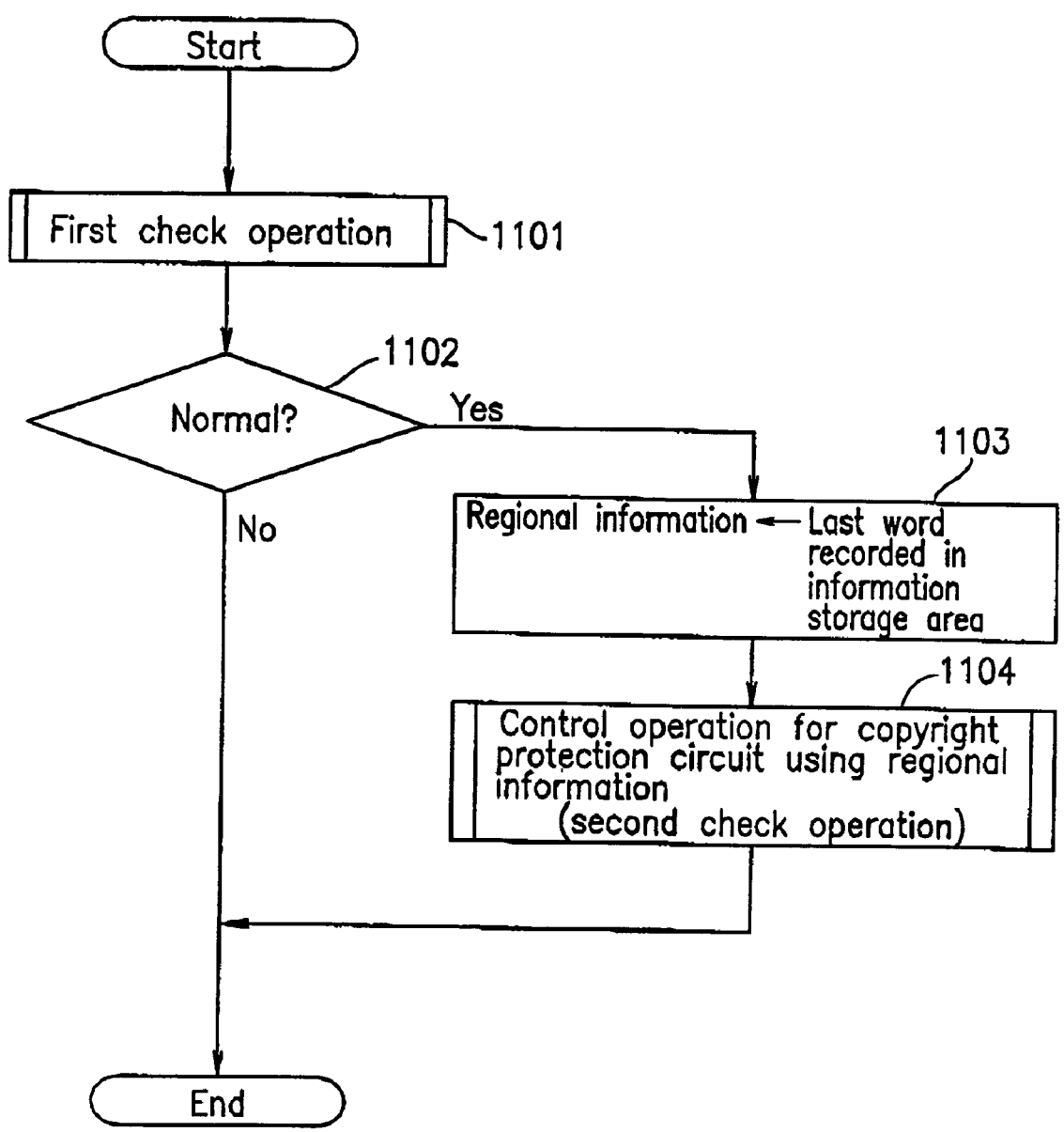
FIG. 11 is a flow chart regarding a second check operation.

FIG. 11 is a flow chart illustrating the second checking operation. After control is transferred to the system control program 616, the first check operation (step 1101) is performed for checking whether or not the information storage area 615 has been tampered. Then, it is determined whether or not the result of the first check operation is "normal" (step 1102). If the result is not "normal", the process is terminated without performing any other operation. If the result is "normal", the current regional information is set based on the last WORD which was recorded in the information storage area 615 by referencing the information storage area 615 (step 1103). Then, by using the regional information and the copyright protection circuit 506, a copyright related operation (i.e., the second check operation) is performed (step 1104).

As described above, the second check operation program 614 is arranged in the boot area 601 (see FIG. 6) in which programs are unlikely to be tampered with, and is executed after control is transferred to the system control program 616 (see FIG. 10). Since the second check operation program 614 includes a program for controlling the copyright protection circuit 506 which does not exist in the system control program 616 stored in the system area 602, it is necessary to invoke the second check operation program 614 in order to perform an operation required by the upper control unit 501. Thus, it is possible to reliably perform the operation of checking whether or not the contents of the information storage area 615 have been tampered and to perform the copyright protection operation according to the contents of the information storage area 615 after control is transferred to the system control program 616.

The value written in the information storage area, the limitation on the order in which the various areas are used, and the value written in the update count storage area, as described above in Embodiment 1 are merely exemplary of the present invention. The present invention can be used in connection with any method or apparatus which protects stored information by using the device characteristic of a Flash Memory that when data is written thereto, without erasing the existing data beforehand, the logical AND of the existing value and the new value is stored therein. Moreover, the information to be stored in the information storage area is not limited to regional information. The position of the information storage area is not limited to the sector having the leading address in the Flash Memory, but the information storage area may be arranged in any sector including the address at which the MPU starts executing programs after it is reset.

In Embodiment 2, the boot area includes the first sector and the second sector. However, the present invention is not limited thereto. The present invention is applicable as long as the sector including the address at which the MPU begins executing programs after it is reset is included in the boot area as its component. Moreover, the flow of the process for the boot area is merely exemplary of the present invention. The present invention is applicable as long as the first check operation can be performed before control is transferred to the system area. The first check operation illustrated in the flow chart of FIG. 9 is also exemplary, and any other procedure may be employed as long as it is possible to check whether or not the information storage area has been tampered with. In the second check operation illustrated in the flow chart of FIG. 11, the check operation is performed in combination with the hardware control solely for the purpose of ensuring that one cannot do away with the second check operation. Any other procedure may be employed as long as this purpose is achieved.

It is understood that the first sector described in Embodiment 2 may include the contents usage count storage area as described above in Embodiment 1, and can be used as a component of a contents usage count storing apparatus of the present invention. Moreover, it is understood that the method of Embodiment 2 can be used as a method for managing the number of times a content has been used and the number of remaining times the content can be used.

The information update count managing method of the present invention advantageously utilizes a Flash Memory as a WORM based on the device characteristic of the Flash Memory that when data is written thereto, without erasing the existing data beforehand, the logical AND of the existing value and the new value is stored therein. Moreover, based on the characteristic that an MPU is designed to begin executing a program stored in a particular address after it is reset, the area to be used as a WORM is arranged in the sector of the Flash Memory including this address, whereby it is possible to prevent data from being erased from that area and to ensure that the area can only be used as a WORM. In such an area, from which data is prevented from being erased, the information containing the number of times a content has been used can be stored. In such a case, the number of times a content has been used can be counted based on the number of "0" bits contained therein. Thus, it is possible to prevent a person from improperly resetting the contents usage count.

In the information update count managing method of the present invention, the program for checking the information storage area is arranged in an area where it is unlikely to be tampered with and is executed before control is transferred to an updatable program. In this way, it is possible to reliably perform the operation of checking whether or not the contents of the information storage area have been tampered with. Therefore, it is possible to assure that the contents of the information storage area are trustworthy at the time when control is transferred to the updatable program.

In the information update count managing method of the present invention, the program for checking the information storage area and the program for performing an operation, in which the contents of the information storage area are used, are arranged in an area where they are unlikely to be tampered with, and are executed after control is transferred to an updatable program. Since the program for performing the check operation includes a process which is essential for performing a process required by the upper control unit, the program must be invoked. Therefore, it is possible to ensure that the operation of checking whether or not the contents of the information storage area have been tampered with, and the operation in which the contents of the information storage area are used, are reliably performed after control is transferred to the updatable program operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information update count managing method, comprising:
    a write step of writing pieces of information in a predetermined order in an information storage area including at least one WORD of a non-volatile memory, wherein information can be written to the non-volatile memory in a unit of WORDs, each WORD including a plurality of bits, and information can be erased from the non-volatile memory in a unit of sectors, each sector including a plurality of WORDs; and
    a read step of reading out a last piece of information which has been written in the information storage area within a predetermined permitted update count, wherein the predetermined permitted update count is stored in the non-volatile memory in a sector which includes a first program to be executed after a reset.

2. An information update count managing method according to claim 1, further comprising an erase step of erasing all of the BITs of all of the WORDs in the sector including the information storage area.

3. An information update count managing method according to claim 1, further comprising an erase step of setting all of the BITs of all of the WORDs in each sector to "1".

4. An information update count managing method according to claim 1, wherein the information storage area is provided in a same sector as an initialization operation program which is a first program to be executed after a reset.

5. An information update count managing method according to claim 1, wherein the predetermined order is an ascending order of addresses of the WORDs.

6. An information update count managing method according to claim 1, wherein an upper limit value of the predetermined permitted update count is determined based on the number of WORDs in the information storage area.

7. An information update count managing method according to claim 1, wherein the pieces of information include regional information which is used for controlling a region where a content can be reproduced.

8. An information update count managing method according to claim 1, wherein:
    the write step comprises a step of writing one or more of the plurality of BITs in the at least one WORD from "1" to "0"; and
    the read step comprises a step of reading out, as the last piece of information which has been written in the information storage area within the predetermined permitted update count, a last hit WORD found in a search through the information storage area for WORDs in which at least one BIT is "0", the WORDs in the information storage area being searched through in the predetermined order.

9. An information update count managing method according to claim 1, wherein:
    the write step comprises a step of writing one BIT in the at least one WORD from "1" to "0"; and
    the read step comprises a step of determining the information of a WORD in which two or more bits are "0" to be invalid.

10. An information update count managing method according to claim 1, wherein the write step comprises a step of storing, in an update count storage area, the number of times information has been written in the information storage area.

11. An information update count managing method according to claim 10, wherein the update count storage area is in the same sector as an initialization operation program which is a first program to be executed after a reset.

12. An information update count managing apparatus, comprising:
a non-volatile memory wherein information can be written to the non-volatile memory in a unit of WORDS, each WORD including a plurality of bits, and information can be erased from the non-volatile memory in a unit of sectors, each sector including a plurality of WORDS, and wherein the non-volatile memory comprises an information storage area including at least one WORD in a first sector of the non-volatile memory; and
a micro processor unit for writing pieces of information in a predetermined order in the WORDs of the information storage area and for reading out a last piece of information which has been written in the at least one WORD of the information storage area within a predetermined permitted update count, wherein the predetermined permitted update count is stored in the non-volatile memory in a sector which includes a first program to be executed after a reset.

13. An information update count managing apparatus according to claim 12, wherein the first sector includes a first program to be executed by the micro processor unit.

14. An information update count managing apparatus according to claim 12, wherein the predetermined order is based on addresses of the WORDs.

15. An information update count managing apparatus according to claim 12, wherein an upper limit value of the predetermined permitted update count is determined based on the number of WORDs in the information storage area.

16. An information update count managing apparatus according to claim 12, wherein the pieces of information include regional information which is used for controlling a region where a content can be reproduced.

17. An information update count managing apparatus according to claim 12, wherein the micro processor unit writes one or more of the plurality of BITs in the at least one WORD from "1" to "0", and reads out, as a last piece of information which has been written in the information storage area within the predetermined permitted update count, a last hit WORD found in a search through the information storage area for the at least one WORD in which at least one BIT is "0", the WORDs in the information storage area being searched through in the predetermined order.

18. An information update count managing apparatus according to claim 12, wherein the micro processor unit writes one BIT in the at least one WORD from "1" to "0", and determines the information of a WORD in which two or more bits are "0" to be invalid.

19. An information update count managing apparatus according to claim 12, wherein the non-volatile memory comprises an update count storage area for storing the number of times information has been written in the information storage area.

20. An information update count managing apparatus according to claim 19, wherein the update count storage area is in a same sector as an initialization operation program which is a first program to be executed by the micro processor unit.

21. A contents usage count managing method, comprising:
a write step of writing a contents usage count in a contents usage count storage area including at least one WORD of a non-volatile memory, wherein information can be written to the non-volatile memory in a unit of WORDs, each WORD including a plurality of bits, and information can be erased from the non-volatile memory in a unit of sectors, each sector including a plurality of WORDs; and
a read step of searching for and reading out the contents usage count which has been written in the contents usage count storage area,
wherein the contents usage count storage area of the non-volatile memory is in a sector which includes a first program to be executed after a reset.

22. A contents usage count managing method according to claim 21, wherein the contents usage count is read out as the number of remaining times the content can be used.

23. A contents usage count managing method according to claim 21, wherein the contents usage count is read out as the number of times the content has been used.

24. A contents usage count storing apparatus, comprising:
a non-volatile memory wherein information can be written to the non-volatile memory in a unit of WORDs, each WORD including a plurality of bits, and information can be erased from the non-volatile memory in a unit of sectors, each sector including a plurality of WORDs, and wherein the non-volatile memory comprises a contents usage count storage area including at least one WORD in a first sector of the non-volatile memory; and
a micro processor unit for writing a contents usage count in the contents usage count storage area and for reading out the contents usage count which has been written in the contents usage count storage area,
wherein the first sector of the non-volatile memory includes a first program to be executed by the micro processor unit after a reset.

25. A contents usage count storing apparatus according to claim 24, wherein the contents usage count is read out as the number of remaining times the content can be used.

26. A contents usage count storing apparatus according to claim 24, wherein the contents usage count is read out as the number of times the content has been used.

27. An information update count managing apparatus, comprising:
a non-volatile memory wherein information can be written to the non-volatile memory in a unit of WORDs, each WORD including a plurality of bits, and information can be erased from the non-volatile memory in a unit of sectors, each sector including a plurality of WORDs; and
a micro processor unit, wherein:
the non-volatile memory includes a boot area and a system area each including one or more sectors;
the boot area comprises an information storage area including at least one WORD;
a micro processor unit initialization program for initializing the micro processor unit is provided in the boot area; and
the micro processor unit writes pieces of information in a predetermined order in an information storage area in the unit of WORDs, and searches for and reads out a last piece of information which has been written in the information storage area within a predetermined permitted update count, wherein the predetermined permitted update count is stored in the non-volatile memory in a sector which includes a first program to be executed after a reset.

28. An information update count managing apparatus according to claim 27, wherein the boot area further comprises a check program for checking contents of the information storage area.

29. An information update count managing apparatus according to claim 28, wherein immediately after the micro processor unit is reset, the micro processor unit executes the micro processor unit initialization program and then the check program, and then the program stored in the system area.

30. An information update count managing apparatus according to claim 27, wherein the boot area further comprises an interface control operation program for receiving a program to be stored in the system area from an upper control unit which is connected to the information update count managing apparatus.

31. An information update count managing apparatus according to claim 27, wherein the boot area further comprises Flash Memory update means for updating a program in the system area.

32. An information update count managing apparatus according to claim 27, wherein immediately after the micro processor unit is reset, the micro processor unit executes the micro processor unit initialization program, and then waits for reception from the upper control unit which is connected to the information update count managing apparatus.

33. An information update count managing apparatus according to claim 27, wherein the micro processor unit calls a program in the boot area from a program in the system area.

34. An information update count managing method, comprising:

a write step of writing pieces of information in a predetermined order in an information storage area including at least one WORD of a non-volatile memory, wherein information can be written to the non-volatile memory in a unit of WORDs, each WORD including a plurality of bits, and information can be erased from the non-volatile memory in a unit of sectors, each sector including a plurality of WORDs; and a read step of reading out a last piece of information which has been written in the information storage area, wherein the write step comprises a step of storing, in a storage area of the non-volatile memory, information indicative of a predetermined characteristic, wherein the step of storing comprises initializing a plurality of bits in the information storage area such that the plurality of bits are assigned to be "1"; and releasing different ones of the plurality of bits to be "0" each time one of the pieces of information is written in the information storage area such that a location of the of "0" bits in the information storage area identifies the predetermined characteristic, wherein a total number of "0" bits within the WORD written to the information storage area does not exceed a predetermined number.

* * * * *

UNITED STATES PATENT AND TRADEMARK OFFICE
CERTIFICATE OF CORRECTION

PATENT NO. : 7,076,623 B1 Page 1 of 1
APPLICATION NO. : 09/689533
DATED : July 11, 2006
INVENTOR(S) : Motoshi Ito, Yoshihisa Fukushima and Shinji Sasaki It is certified that error appears in the above-identified patent and that said Letters Patent is hereby corrected as shown below:

Column 20, lines 26-27, "a location of the of "0" bits" should read -- a location of the "0" bits -- .

Signed and Sealed this

Sixth Day of March, 2007

JON W. DUDAS
*Director of the United States Patent and Trademark Office*